US007566375B2

(12) United States Patent
Huang

(10) Patent No.: US 7,566,375 B2

(45) Date of Patent: Jul. 28, 2009

(54) PANEL GRIP WITH CUT-OUTS AND INSERTS

(76) Inventor: Ben Huang, 19742 Woodlands La., Huntington Beach, CA (US) 92648

(*) Notice: Subject to any disclaimer, the term of this patent is extended or adjusted under 35 U.S.C. 154(b) by 538 days.

(21) Appl. No.: 11/417,623

(22) Filed: May 3, 2006

(65) Prior Publication Data

US 2007/0169872 A1 Jul. 26, 2007

Related U.S. Application Data

(60) Provisional application No. 60/762,364, filed on Jan. 25, 2006.

(51) Int. Cl.
*B32B 37/00* (2006.01)

(52) U.S. Cl. ......................... 156/63; 156/256; 156/264; 156/265; 156/293; 156/299; 156/247; 156/344

(58) Field of Classification Search .................. 156/63, 156/247, 264, 265, 256, 293, 299, 344
See application file for complete search history.

(56) References Cited

U.S. PATENT DOCUMENTS

| | | | |
|---|---|---|---|
| 571,025 | A | 11/1896 | Spamer |
| 834,711 | A | 10/1906 | Clarke et al. |
| 979,266 | A | 12/1910 | Dean |
| 1,008,604 | A | 11/1911 | Lake |
| 1,017,565 | A | 2/1912 | Lard |
| 1,139,843 | A | 5/1915 | Brown |
| 1,345,505 | A | 7/1920 | Persons |
| 1,435,088 | A | 11/1922 | Smith |
| 1,522,635 | A | 1/1925 | Kraeuter |
| 1,528,190 | A | 3/1925 | Howe |
| 1,617,972 | A | 2/1927 | Wallace |
| 1,890,037 | A | 12/1932 | Johnson |
| 1,943,399 | A | 1/1934 | Smith |
| 2,000,295 | A | 5/1935 | Oldham |
| 2,086,062 | A | 7/1937 | Bray |

(Continued)

FOREIGN PATENT DOCUMENTS

CN 2139008 Y 7/1993

(Continued)

OTHER PUBLICATIONS

European Search Report, European Application No. EP 04 25 7967, 4 pages- cites: US 2004/185958; EP 1 371 397; US 2,225,839; US 6,666,777; US 5,839,983; US 5,577,722; and US 979,266.

(Continued)

*Primary Examiner*—Jeff H Aftergut
(74) *Attorney, Agent, or Firm*—Knobbe Martens Olson & Bear LLP

(57) ABSTRACT

A grip for the handle of a golf club having at least a sheet with a cut-out and an insert. The insert is positioned within or against the cut-out of the sheet to define a panel. The panel is then attached to an underlisting sleeve. The grip reduces impact shock and provides a feeling of tackiness in the manner of a spirally wrapped polyurethane-felt grip while allowing the use of multiple color panels and inserts, easy installation onto a golf club shaft, and placement of various materials in various grip areas.

9 Claims, 15 Drawing Sheets

U.S. PATENT DOCUMENTS

| | | | |
|---|---|---|---|
| 2,103,889 | A | 12/1937 | Brisick |
| 2,149,911 | A | 3/1939 | East |
| 2,206,056 | A | 7/1940 | Sheesley |
| 2,221,421 | A | 11/1940 | Curry |
| 2,225,839 | A | 12/1940 | Moore |
| 2,449,575 | A | 9/1948 | Wilhelm |
| 2,523,637 | A | 9/1950 | Stanfield et al. |
| 2,671,660 | A | 3/1954 | Goodwin |
| 2,690,338 | A | 9/1954 | Brocke |
| 2,772,090 | A | 11/1956 | Brandon |
| 2,934,285 | A | 4/1960 | Niehaus |
| 2,984,486 | A | 5/1961 | Jones |
| 3,028,283 | A * | 4/1962 | Lundgren et al. ............. 156/63 |
| 3,059,816 | A | 10/1962 | Goldstein |
| 3,087,729 | A | 4/1963 | Sullivan |
| 3,095,198 | A | 6/1963 | Gasche |
| 3,140,873 | A | 7/1964 | Goodwin |
| 3,157,723 | A | 11/1964 | Hochberg |
| 3,311,375 | A | 3/1967 | Onions |
| 3,366,384 | A | 1/1968 | Lamkin et al. |
| 3,606,325 | A | 9/1971 | Lamkin et al. |
| 3,857,745 | A | 12/1974 | Grausch et al. |
| 3,922,402 | A | 11/1975 | Shimamura et al. |
| 3,992,021 | A | 11/1976 | Tobin |
| 4,012,039 | A | 3/1977 | Yerke |
| 4,015,851 | A | 4/1977 | Pennell |
| 4,052,061 | A | 10/1977 | Stewart |
| 4,133,529 | A | 1/1979 | Gambino |
| 4,137,360 | A | 1/1979 | Reischl |
| 4,216,251 | A | 8/1980 | Nishimura et al. |
| 4,284,275 | A | 8/1981 | Fletcher |
| 4,347,280 | A | 8/1982 | Lau et al. |
| 4,358,499 | A | 11/1982 | Hill |
| 4,448,922 | A | 5/1984 | McCartney |
| 4,535,649 | A | 8/1985 | Stahel |
| 4,651,991 | A | 3/1987 | McDuff |
| 4,662,415 | A | 5/1987 | Proutt |
| 4,765,856 | A | 8/1988 | Doubt |
| 4,878,667 | A | 11/1989 | Tosti |
| 4,919,420 | A | 4/1990 | Sato |
| 4,941,232 | A | 7/1990 | Decker et al. |
| 4,971,837 | A | 11/1990 | Martz et al. |
| 5,024,866 | A | 6/1991 | Goode |
| 5,055,340 | A | 10/1991 | Matsumura et al. |
| 5,118,107 | A | 6/1992 | Bucher |
| 5,123,646 | A | 6/1992 | Overby et al. |
| 5,127,650 | A | 7/1992 | Schneller |
| 5,261,665 | A | 11/1993 | Downey |
| 5,322,290 | A | 6/1994 | Minami |
| 5,343,776 | A | 9/1994 | Falco |
| 5,374,059 | A | 12/1994 | Huang |
| 5,427,376 | A | 6/1995 | Cummings et al. |
| 5,469,601 | A | 11/1995 | Jackson |
| 5,474,802 | A | 12/1995 | Shimoda et al. |
| 5,480,146 | A | 1/1996 | Comer |
| 5,485,996 | A | 1/1996 | Niksich |
| 5,511,445 | A | 4/1996 | Hildebrandt |
| 5,570,884 | A | 11/1996 | Carps |
| 5,571,050 | A | 11/1996 | Huang |
| 5,577,722 | A | 11/1996 | Glassberg |
| 5,584,482 | A | 12/1996 | Huang |
| 5,595,544 | A | 1/1997 | Roelke |
| 5,611,533 | A | 3/1997 | Williams |
| 5,624,116 | A | 4/1997 | Yeh |
| 5,626,527 | A | 5/1997 | Eberlein |
| 5,645,501 | A | 7/1997 | Huang |
| 5,671,923 | A | 9/1997 | Huang |
| 5,690,566 | A | 11/1997 | Bracho |
| 5,695,418 | A | 12/1997 | Huang |
| 5,730,662 | A | 3/1998 | Rens |
| 5,730,669 | A | 3/1998 | Huang |
| 5,772,524 | A | 6/1998 | Huang |
| 5,781,963 | A | 7/1998 | Maru et al. |
| 5,797,813 | A | 8/1998 | Huang |
| 5,813,921 | A | 9/1998 | Huang |
| 5,816,933 | A | 10/1998 | Huang |
| 5,827,129 | A | 10/1998 | Huang |
| 5,839,983 | A | 11/1998 | Kramer |
| 5,851,632 | A | 12/1998 | Chen et al. |
| 5,857,929 | A | 1/1999 | Huang |
| 5,867,868 | A | 2/1999 | Ward |
| 5,890,260 | A | 4/1999 | Gaunt |
| 5,890,972 | A | 4/1999 | Huang |
| 5,895,329 | A | 4/1999 | Huang |
| 5,910,054 | A | 6/1999 | Huang |
| 5,924,941 | A | 7/1999 | Hagey |
| 5,997,421 | A | 12/1999 | Huang |
| 6,036,607 | A | 3/2000 | Finegan |
| 6,048,275 | A | 4/2000 | Gedeon |
| 6,197,392 | B1 | 3/2001 | Jones |
| 6,226,836 | B1 | 5/2001 | Yasui |
| 6,244,975 | B1 | 6/2001 | Huang |
| 6,261,191 | B1 | 7/2001 | Chen |
| 6,361,450 | B1 | 3/2002 | Huang |
| 6,386,989 | B1 | 5/2002 | Huang |
| D463,520 | S | 9/2002 | Ulrich |
| 6,449,803 | B1 | 9/2002 | McConchie |
| 6,503,153 | B2 | 1/2003 | Wang |
| 6,506,128 | B1 | 1/2003 | Bloom, Jr. |
| 6,511,732 | B1 | 1/2003 | Chao |
| 6,551,198 | B2 | 4/2003 | Huang |
| 6,558,270 | B2 | 5/2003 | Kwitek |
| 6,627,027 | B2 | 9/2003 | Huang |
| 6,629,901 | B2 | 10/2003 | Huang |
| 6,635,688 | B2 | 10/2003 | Simpson |
| 6,652,398 | B2 | 11/2003 | Falone et al. |
| 6,656,054 | B2 | 12/2003 | Ulrich |
| 6,656,057 | B2 | 12/2003 | Lamkin et al. |
| 6,663,500 | B2 | 12/2003 | Huang |
| 6,666,777 | B1 | 12/2003 | Falone et al. |
| 6,676,534 | B2 | 1/2004 | Huang |
| 6,709,346 | B1 | 3/2004 | Wang |
| 6,733,401 | B1 | 5/2004 | Huang |
| 6,827,656 | B1 | 12/2004 | Hoeflich et al. |
| 6,843,732 | B1 | 1/2005 | Huang |
| 6,857,971 | B2 | 2/2005 | Huang |
| 6,908,400 | B2 | 6/2005 | Chu et al. |
| 7,008,582 | B2 | 3/2006 | Chen |
| 7,048,644 | B2 | 5/2006 | Wang |
| 7,137,904 | B2 | 11/2006 | Huang |
| 7,140,973 | B2 | 11/2006 | Rohrer |
| D534,602 | S | 1/2007 | Norton et al. |
| D534,603 | S | 1/2007 | Norton et al. |
| D534,604 | S | 1/2007 | Norton et al. |
| D534,605 | S | 1/2007 | Norton et al. |
| D534,607 | S | 1/2007 | Norton et al. |
| D534,975 | S | 1/2007 | Norton et al. |
| D536,048 | S | 1/2007 | Chen |
| D538,868 | S | 3/2007 | Norton et al. |
| D538,869 | S | 3/2007 | Wang et al. |
| 7,186,189 | B2 | 3/2007 | Huang |
| 7,195,568 | B2 | 3/2007 | Huang |
| 7,219,395 | B2 | 5/2007 | Bigolin |
| 7,344,447 | B2 | 3/2008 | Chang |
| 7,344,448 | B2 | 3/2008 | Huang |
| 7,404,770 | B2 | 7/2008 | Huang |
| 7,448,957 | B2 * | 11/2008 | Huang ........................ 156/293 |
| 7,448,958 | B2 | 11/2008 | Huang |
| 7,458,903 | B2 | 12/2008 | Wang et al. |
| 7,470,199 | B2 | 12/2008 | Huang |
| 2002/0028325 | A1 | 3/2002 | Simpson |
| 2002/0142858 | A1 | 10/2002 | Chen |
| 2002/0142900 | A1 | 10/2002 | Wang |
| 2002/0151373 | A1 | 10/2002 | Beauregard |

| | | | |
|---|---|---|---|
| 2002/0173371 | A1 | 11/2002 | Lamkin et al. |
| 2003/0040384 | A1 | 2/2003 | Falone et al. |
| 2003/0045370 | A1 | 3/2003 | Jaw |
| 2003/0062654 | A1 | 4/2003 | Lamkin |
| 2003/0139223 | A1 | 7/2003 | Ulrich et al. |
| 2003/0148836 | A1 | 8/2003 | Falone et al. |
| 2003/0150081 | A1 | 8/2003 | Wang |
| 2003/0216192 | A1 | 11/2003 | Chu |
| 2003/0228930 | A1 | 12/2003 | Huang |
| 2004/0029645 | A1 | 2/2004 | Chen |
| 2004/0029646 | A1 | 2/2004 | Chu et al. |
| 2004/0031128 | A1 | 2/2004 | Chen |
| 2004/0109980 | A1 | 6/2004 | Chen et al. |
| 2004/0123429 | A1 | 7/2004 | Wang |
| 2004/0185958 | A1 | 9/2004 | Huang |
| 2005/0276925 | A1 | 12/2005 | Su |
| 2006/0172815 | A1 | 8/2006 | Chu |
| 2006/0252571 | A1 | 11/2006 | Wang |
| 2006/0287123 | A1 | 12/2006 | Wang |
| 2007/0149307 | A1 | 6/2007 | Huang |

FOREIGN PATENT DOCUMENTS

| | | | |
|---|---|---|---|
| CN | 2163667 | Y | 5/1994 |
| CN | 2288744 | | 8/1998 |
| CN | 1332022 | A | 7/2000 |
| CN | 2444645 | | 8/2001 |
| CN | 02254450.X | | 9/2002 |
| EP | 1 371 397 | | 12/2003 |
| FR | 2 731 402 | A3 | 9/1996 |
| JP | 55-43008 | | 3/1980 |
| JP | 7-41731 | | 2/1995 |
| JP | 3081404 | | 8/2001 |
| JP | 2002-028264 | | 1/2002 |
| WO | WO 2005/115563 | A1 | 12/2005 |

OTHER PUBLICATIONS

Partial European Search Report, App. No. EP 03 25 5917, 2 pages-cites: 5,671,923; 4,765,856; US 2002/173371; US 2003/040384; and 5,571,050.
U.S. Appl. No. 10/167,216, filed Jun. 11, 2002, pending.
U.S. Appl. No. 10/608,598, filed Jun. 27, 2003, pending.
U.S. Appl. No. 10/785,379, filed Feb. 24, 2004, pending.
U.S. Appl. No. 10/827,095, filed Apr. 19, 2004, pending.
U.S. Appl. No. 10/875,035, filed Jun. 23, 2004, pending.
U.S. Appl. No. 11/029,328, filed Jan. 5, 2005, pending.
U.S. Appl. No. 11/062,046, filed Feb. 18, 2005, pending.
U.S. Appl. No. 11/131,832, filed May 18, 2005, pending.
U.S. Appl. No. 11/172,770, filed Jul. 1, 2005, pending.
U.S. Appl. No. 11/412,196, filed Apr. 25, 2006, pending.
U.S. Appl. No. 11/416,364, filed May 1, 2006, pending.
U.S. Appl. No. 11/413,411, filed Apr. 28, 2006, pending.
U.S. Appl. No. 11/438,808, filed May 22, 2006, pending.
U.S. Appl. No. 11/417,696, filed May 3, 2006, pending.
U.S. Appl. No. 11/417,643, filed May 3, 2006, pending.
U.S. Appl. No. 11/417,555, filed May 3, 2006, pending.
U.S. Appl. No. 11/417,401, filed May 3, 2006, pending.
European Search Report EP 06254204.8 dated Jun. 5, 2007.
The Random House College Dictionary, Revised Edition, 1975, p. 1233, definition of skive3
U.S. Appl. No. 11/682,264, filed Mar. 5, 2007, (U.S. Pub. No. 2007-0149307 A1), pending (180C1).
U.S. Appl. No. 11/689,452, filed Mar. 21, 2007, (U.S. Pub. No. 2008-0230174 A1), pending (214A).
U.S. Appl. No. 12/045,639, filed Mar. 10, 2008, (U.S. Pub. No. 2008-0229646 A1), pending (212A).
U.S. Appl. No. 12/123,384, filed May 19, 2008, (U.S. Pub. No. 2008-0283178 A1),pending (11CP5DV1C1).
U.S. Appl. No. 11/838,670, filed Aug. 14, 2007, pending (217A).
U.S. Appl. No. 12/055,289, filed Mar. 25, 2008, pending (207C1).

* cited by examiner 60
5
5

38
2
12
3

2
40

60
61

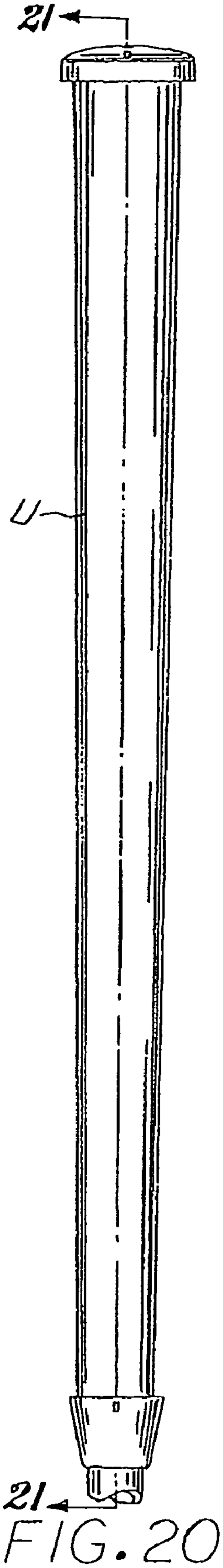
FIG. 20
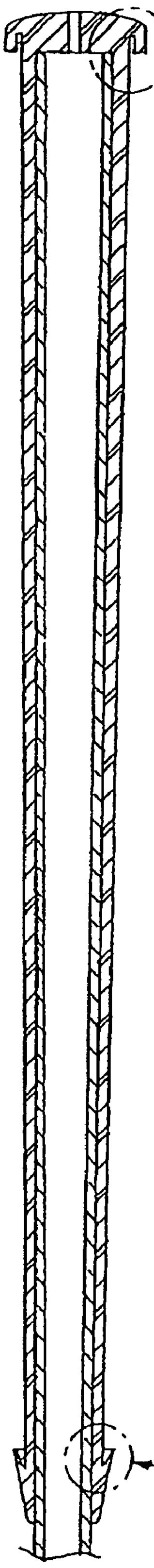
FIG. 21
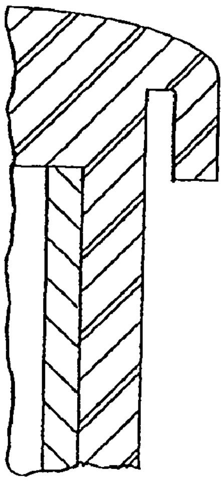
FIG. 22
FIG. 23
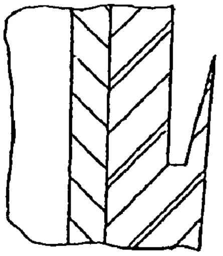

FIG. 39
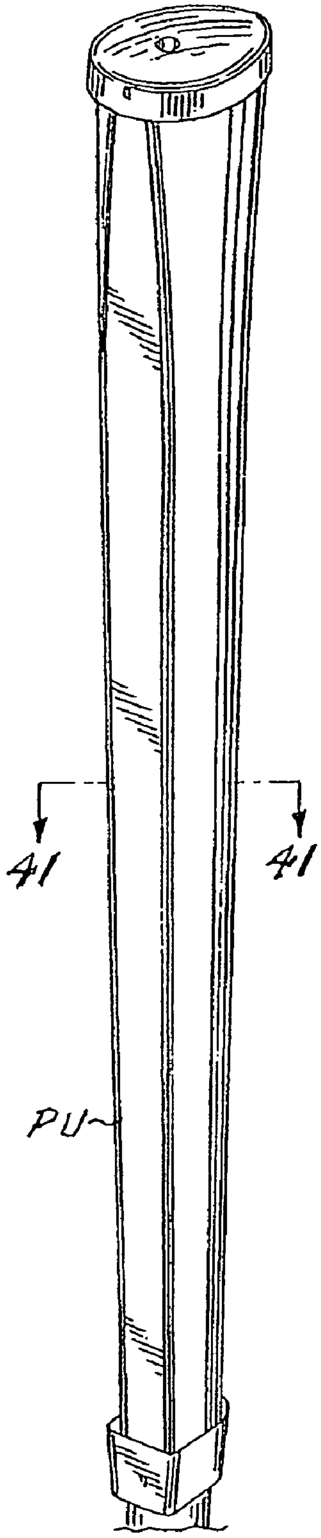
FIG. 40
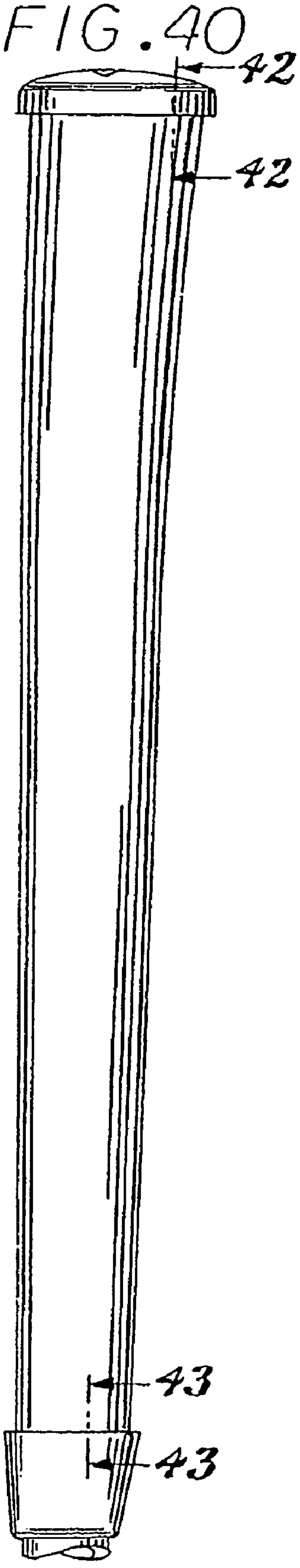
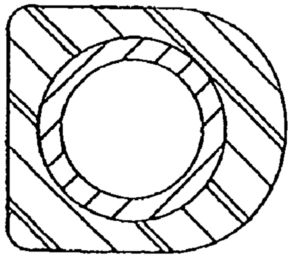
FIG. 41
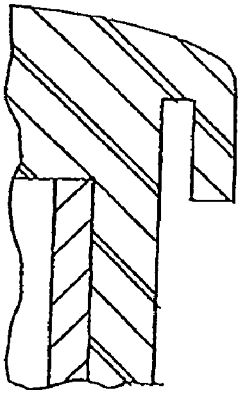
FIG. 42
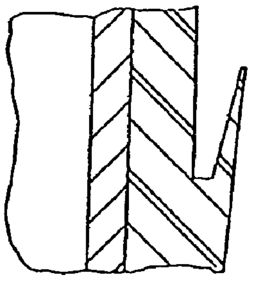
FIG. 43

FIG. 47
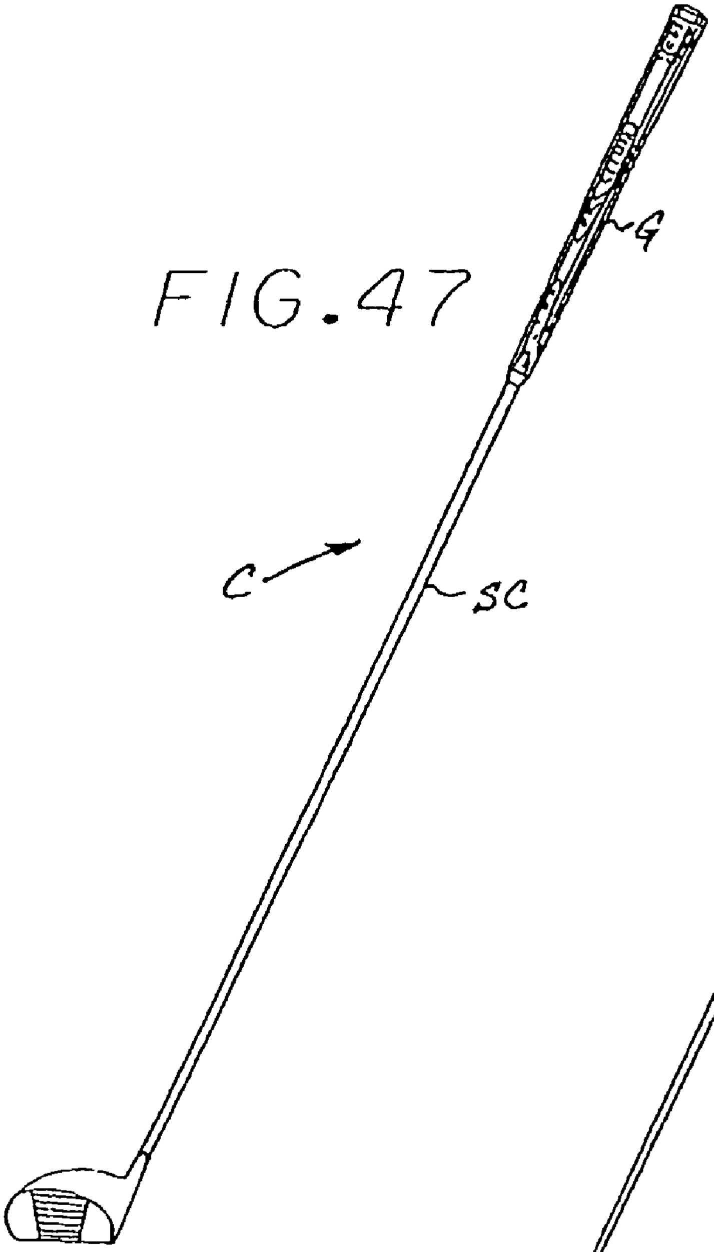
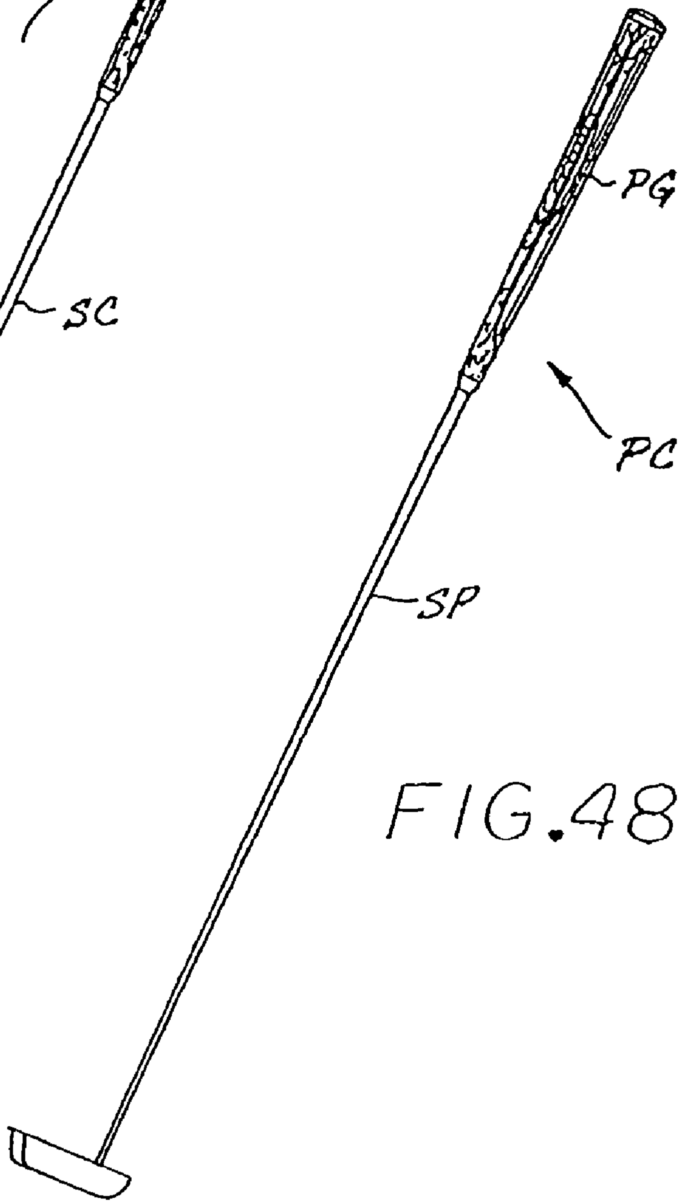
FIG. 48

PANEL GRIP WITH CUT-OUTS AND INSERTS

RELATED U.S. APPLICATION DATA

This application claims the benefit of U.S. Provisional Application No. 60/762,364, filed Jan. 25, 2006.

BACKGROUND OF THE INVENTION

INCORPORATION BY REFERENCE

This application hereby incorporates by reference U.S. patent application Ser. No. 11/172,770, filed Jul. 1, 2005, pending, U.S. Pat. Nos. 6,244,975; 6,627,027; 6,695,713; 6,843,732; and 6,857,971, and U.S. Provisional Application No. 60/762,364, filed Jan. 25, 2006, each in its entirety.

1. Field of the Invention

This application relates to an improved grip for shafts. In particular, this application relates to an improved grip for the shafts of golf clubs.

2. Description of the Related Art

Applicant has previously developed resilient grips which successfully reduce impact shock to the muscle and arm joints of the users of golf clubs and also provide a feeling of tackiness between the player's hands and the grip. See, for example, U.S. Pat. No. 5,797,813 granted to Applicant on Aug. 25, 1998, U.S. Pat. No. 6,843,732 granted to Applicant on Jan. 18, 2005, and U.S. Pat. No. 6,857,971 granted to Applicant on Feb. 22, 2005.

The earliest of these grips utilize a polyurethane-felt strip which is spirally wrapped around an underlisting sleeve that is slipped onto and adhered to a golf club shaft. The sides of the strips are formed with overlapping heat depressed recessed reinforcement edges. While such grips have proven satisfactory in reducing impact shock, the fabrication is labor intensive, particularly since the strip must be wrapped manually about the underlisting sleeve within specific pressure parameters. Additionally, it is difficult to accurately align the adjoining side edges of the strip as such strip is being spiraling wrapped about the underlisting sleeve. These wrapped grips can become twisted during the wrapping process, allow for only limited display of decorative designs, and allow for only a limited placement of colors.

Applicant's U.S. Pat. No. 6,857,971 sought to overcome two of the aforementioned disadvantages of existing spirally wrapped grips while providing the same resistance to shock afforded by such grips, as well as providing tackiness. Specifically, this patent discloses forming a structurally integral grip from a single polyurethane-felt panel having a configuration corresponding to the exterior shape of an underlisting sleeve. While this design removes the twisting problems associated with the wrapping process and offers more area to display decorative designs, it is limited in its ability to accommodate multiple color schemes which are so popular in today's modern world of golf.

Applicant's U.S. Pat. No. 6,843,732 sought to overcome the aforementioned disadvantages while still providing tackiness by incorporating multiple initially distinct two layer panels. Such a design allows grips made according to the teachings of U.S. Pat. No. 6,843,732 to accommodate multiple color combinations that would not have been possible with the single panel grips or the spirally wrapped grips of old.

While such grips have continued to prove satisfactory in reducing impact shock, they allow for only limited display of decorative designs and limited placement of colors.

SUMMARY OF THE INVENTION

Embodiments of the golf club grip of the present invention overcome the aforementioned disadvantages of existing spirally wrapped grips and the single panel grips while providing the same resistance to shock afforded by such grips, as well as providing tackiness. Desirably, a structurally integral grip is formed from at least a sheet with a cut-out and an insert.

One embodiment is a grip for use on the shaft of a golf club, including a preferably resilient underlisting sleeve and a panel with an outer surface, a first portion defining an outer surface and circumscribing a cut-out, and an insert positioned within the cut-out. The insert includes an outer surface. The outer surface of the panel includes the outer surface of the first portion and the outer surface of the insert. The panel is attached to the underlisting sleeve such that the outer surface of the panel defines an outer surface of the grip.

In some embodiments, the insert and the panel each include different durometer materials or colors.

In some embodiments, the panel includes a top side, a bottom side, a first substantially vertical side, and a second substantially vertical side. The panel is preferably wrapped about the underlisting sleeve such that the first and second sides join to form a substantially vertical seam. Though not required, the first and second vertical sides may be skived. In some embodiments, the sides are skived parallel to each other. In other embodiments, the sides are skived anti-parallel to each other. The skived sides may abut each other and/or overlap each other. The panel may include a friction enhancing pattern on its outer surface. The intersections between portions of the panel may include one or more adhesives.

Another embodiment is a grip for use on the shaft of a golf club, including a preferably resilient underlisting sleeve and a panel including a cut-out and an insert abutting the cut-out. The panel also preferably includes a recessed channel along at least a portion of the intersection between the cut-out and the insert. The panel is preferably attached to the underlisting sleeve. In some embodiments, the channel is melted and may include a deposit of polyurethane.

Another embodiment is a method of making a grip for use on the shaft of a golf club comprising the steps of: providing a resilient underlisting sleeve; providing a sheet comprising an outer surface; forming a cut-out in the sheet so that the sheet includes a first portion circumscribing the cut-out; providing an insert comprising an outer surface; positioning the insert within the cut-out; attaching the sheet to the underlisting sleeve such that the outer surface of the sheet defines a portion of the outer surface of the grip; and attaching the insert to the underlisting sleeve such that the outer surface of the insert defines a portion of the outer surface of the grip. The method may also include joining the sheet and the insert to form a panel and attaching the panel to the underlisting sleeve to attach the sheet and the insert to the underlisting sleeve.

Yet another embodiment is a method of making a grip for use on the shaft of a golf club comprising the steps of: providing a resilient underlisting sleeve; providing a sheet; forming a cut-out in the sheet; providing an insert; positioning the insert such that it abuts the cut-out; forming a recessed channel along at least a portion of the intersection between the cut-out and the insert; attaching the sheet to the underlisting sleeve; and attaching the insert to the underlisting sleeve. The method may also include joining the sheet and the insert to form a panel and attaching the panel to the underlisting sleeve to attach the sheet and the insert to the underlisting sleeve.

Another embodiment is a method of making a grip for use on the shaft of a golf club comprising the steps of: providing a resilient underlisting sleeve; providing a first backing sheet;

providing a second sheet; forming a cut-out in the second sheet; providing an insert; arranging the second sheet and the insert on the first backing sheet; joining the second sheet and the insert along the intersection of the cut-out and the insert to define a panel; removing the backing sheet; and attaching the panel to the underlisting sleeve.

Other embodiments include a grip and a method of making a grip for use with other impact imparting implements, including, but not limited to, tennis rackets, polo clubs, hockey sticks, badminton rackets, hammers, and the like. Further, such grips could also be adapted for use with other handles that are grasped by a user's hand wherein the features of the herein described invention could be useful and beneficial, including bicycle grips, walking sticks, tow rope handles for use with wakeboarding, water skiing, and the like, and other types of handles.

Embodiments of the present invention may be manufactured at considerably less cost than existing spirally wrapped grips since it eliminates the intensive labor of spirally wrapping a strip around an underlisting sleeve within specific pressure parameters. Additionally, embodiments should not twist either during manufacture or after it is adhered to an underlisting sleeve. My new grip desirably has an appearance similar to conventional molded rubber grips so as to appeal to professional golfers and low-handicap amateurs, and also provides a greater area for the application of decorative designs. Further, embodiments of the present invention can also accommodate multiple color combinations, thus appealing to golfers and college programs who wish to display their school colors while playing the sport they love. Embodiments of the present invention are easy to install. Furthermore, embodiments of the present invention allow us to place various materials in various grip areas. For example, one or more different materials can be used where there is more expected contact between the user's hand and the grip, such as where the base of the hand in the palm area contacts the grip or where the pads of the fingers contact the grip. The choice of materials can be made to adjust various parameters of the grip, such as tackiness, feel, and/or durability.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 20 is it a front view of an underlisting sleeve member of a panel grip according to one embodiment;

FIG. 21 is a vertical cross-sectional view taken along the line designated 21-21 in FIG. 20;

FIG. 22 is an enlarged view of the encircled area designated 22 in FIG. 21;

FIG. 23 is an enlarged view of the encircled area designated 23 in FIG. 21;

FIG. 39 is a perspective front view of an underlisting sleeve member of a panel grip according to one embodiment;

FIG. 40 is a side view of the underlisting sleeve shown in FIG. 39;

FIG. 41 is a cross-sectional view taken along the line designated 41-41 in FIG. 39;

FIG. 42 is a vertical cross-sectional view taken along the line designated 42-42 in FIG. 40;

FIG. 43 is a vertical cross-sectional view taken along the line designated 43-43 in FIG. 40;

FIG. 47 is a perspective view of a golf club provided with a panel grip according to one embodiment;

FIG. 48 is a perspective view of a golf club provided with a panel grip according to one embodiment.

Figure 1:
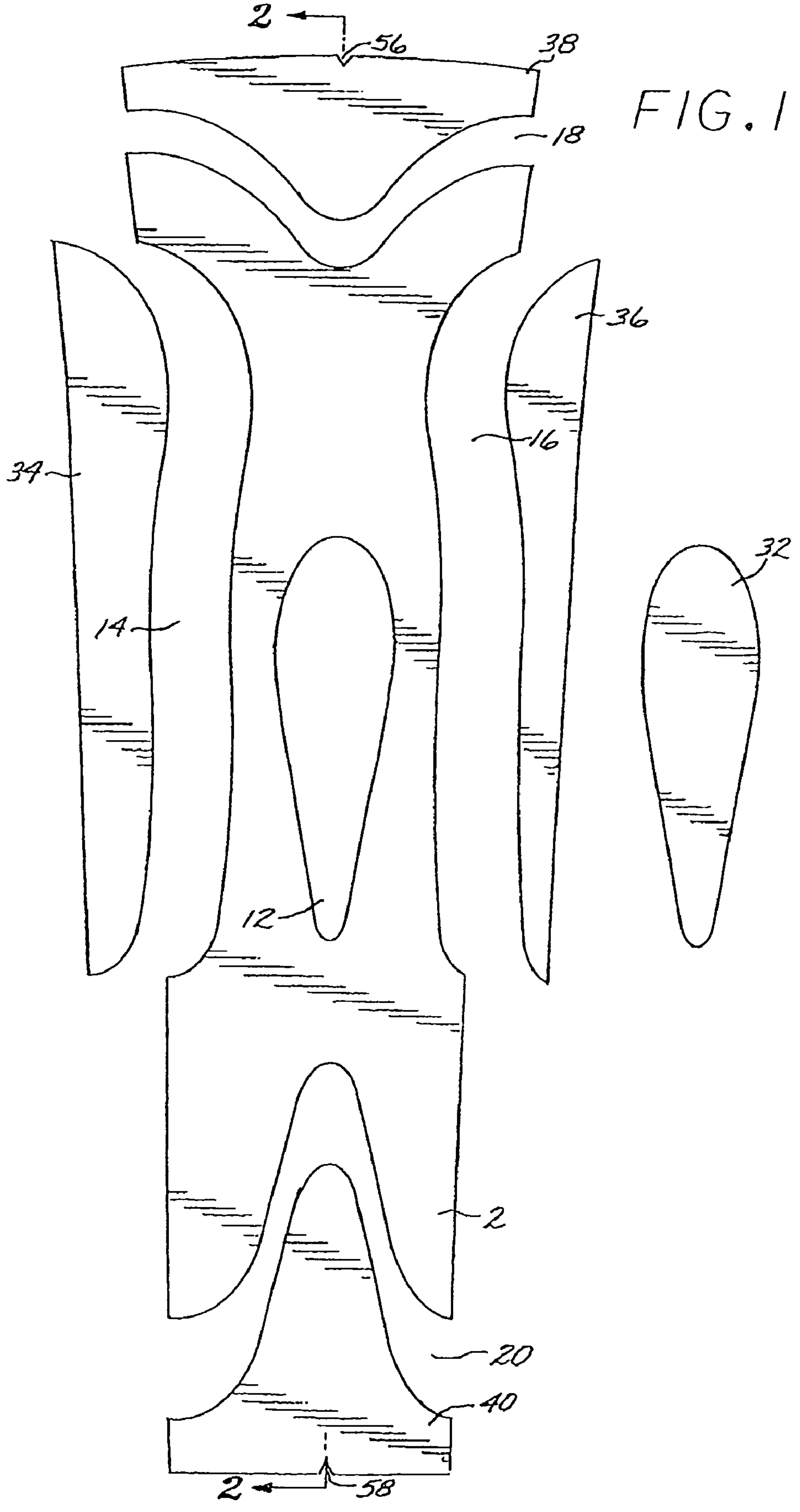
FIG. 1 is a front rear view of a first sheet and inserts used in a panel grip according to one embodiment.

Throughout the figures, similar reference numerals and characters are generally used to denote like features, elements, components, or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION

Referring to the drawings, in FIG. 47, a panel grip G embodying the present invention is shown attached the shaft SC of a golf club C. In FIG. 48, a putter grip PG embodying the present invention is shown attached to the shaft SP of a putter PC. Referring now to the remaining drawings, a grip includes a sheet coupled to an insert to form a panel which is then wrapped about and coupled to a resilient underlisting sleeve of a conventional construction. Throughout the application, the term top is used to refer to that which is closest to the bottom end of the club opposite the club head, i.e. the end closest to the golfer if that golfer were to be swinging or stroking the club. Similarly, the term bottom is used to define that which is furthest from the butt end of the club.

Grip G preferably includes a panel P (FIG. 13) and an underlisting sleeve U (FIG. 20). As shown in FIG. 1, panel P includes a first sheet 2 and one or more inserts (32, 34, 36, 38, 40). In the illustrated embodiment, a first portion of sheet 2 circumscribes a cutout 12. A second portion of sheet 2 defines a first side cutout 14. A second portion of sheet 2 defines a second side cutout 16. A third portion of sheet 2 defines a top cutout 18. Finally, in the illustrated embodiment, a fifth portion of sheet 2 defines a bottom cutout 20. The sheet, including each of the portions of the sheet, defines an outer surface.

Inserts 32, 34, 36, 38, 40 are shaped to correspond with cutouts 12, 14, 16, 18, 20, respectively. Each of the inserts defines an outer surface. The outer surface of the grip desirably comprises the outer surface of the sheet and the outer surfaces of the inserts. Notches 56 and 58 define the midline of the finished panel P. These notches, or other centering indicia, are used to arrange the panel P on the underlisting sleeve U, as explained in other applications and issued patents incorporated herein in their entireties, such as, for example, U.S. Pat. No. 6,843,732, issued on Jan. 18, 2005.

Figure 14:
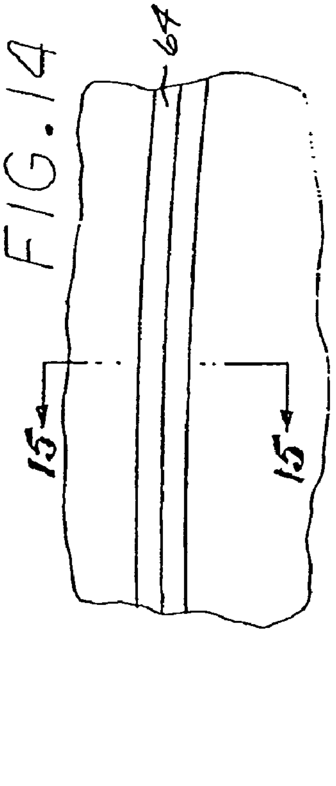
FIG. 14 is an enlarged view of the encircled area designated 14 in FIG. 13.

Referring to FIG. 14, panel P preferably includes an off-set symmetrical sheet and cutout arrangement. A symmetrical arrangement would be an arrangement of the sheet and cutouts such that a line drawn through the centering notches 56 and 58 would divide the panel P into two equal, or symmetrical, halves. In the illustrated off-set symmetrical arrangement, one side is extended further than the other. In FIG. 1, the left hand side of sheet 2 and inserts 34, 38, and 40 extend further to the left. This off-set is useful to accommodate parallel skived or cut sides as is described in greater detail in U.S. Pat. No. 6,843,732. Once the left side of the panel P is skived, the portion of the panel which defines the outer surface of the grip will preferably be generally symmetrical.

Panel P is formed by coupling a first sheet 2 and one or more inserts 32, 34, 36, 38, 40. In the illustrated embodiment, sheet 2 and the inserts 32, 34, 36, 38, 40 are shaped such that when brought into mating contact, the combination thereof substantially forms the panel P. The panel P is preferably sized to generally correspond to the outer surface area of the underlisting sleeve U. In other embodiments, the sheet and inserts are coupled together and subsequently die cut or otherwise further manipulated such that they ultimately form a panel P that generally corresponds to the outer surface area of the underlisting sleeve U. Formation of such inserts and various materials that may be used therein are disclosed in greater detail in U.S. patent application Ser. No. 11/172,770, filed Jul. 1, 2005.

FIG. 1 illustrates sheet 2 and the corresponding inserts 32, 34, 36, 38, 40. Sheet 2 preferably includes cutouts 12, 14, 16, 18, 20. Sheet 2 is preferably cut, sliced, and or otherwise removed and separated from a larger sheet of material (not shown). Sheet 2 may also be formed according to practices well known to those of skill in the art. Cutouts 12, 14, 16, 18, 20 are preferably formed by similar means.

Similarly, inserts 32, 34, 36, 38, 40 are preferably removed and separated from larger sheets of material. Advantageously, sheet 2 and inserts 32, 34, 36, 38, 40 may include materials of one or more differing properties and may be positioned to maximize the benefit of one or more of those properties. For example, there may be locations of increased wear on the grip G during use. Cutouts may be strategically placed in these areas of increased wear and corresponding inserts may be placed in those areas. These inserts may include materials of increased strength, durability, or durometer, which may make them better suited to absorb the forces imparted to those areas of the grip. As those of skill in the art will appreciate from the foregoing, these inserts may have different levels of tackiness and that the inserts could be selected based on tackiness.

Figure 13:
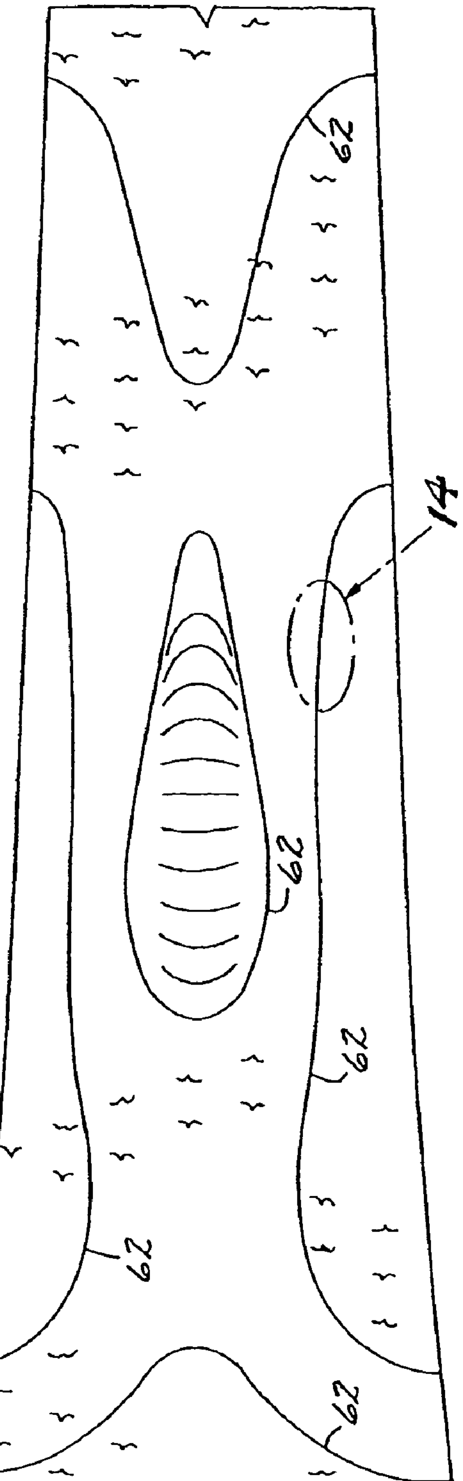
FIG. 13 is a front view of a panel member of a panel grip according to one embodiment.

It also may be desirous to include certain areas of a different color. In such an instance, cutouts may be formed and correspondingly shaped inserts may be used in those locations with different colors. As illustrated in FIG. 13, the panel P may include one or more friction enhancing patterns. Sheet 2 or inserts 32, 34, 36, 38, 40 may include these one or more friction enhancing patterns prior to being formed into panel P, or may be manipulated to include these patterns after being formed into panel P. In the earlier case, the patterns may be formed when the components are cut from the larger sheets or they may be formed in a separate step. These different colors may be used on cutouts with the same physical properties and/or cutouts having the same physical properties may share the same color.

Figures 2, 3, 4, 5:
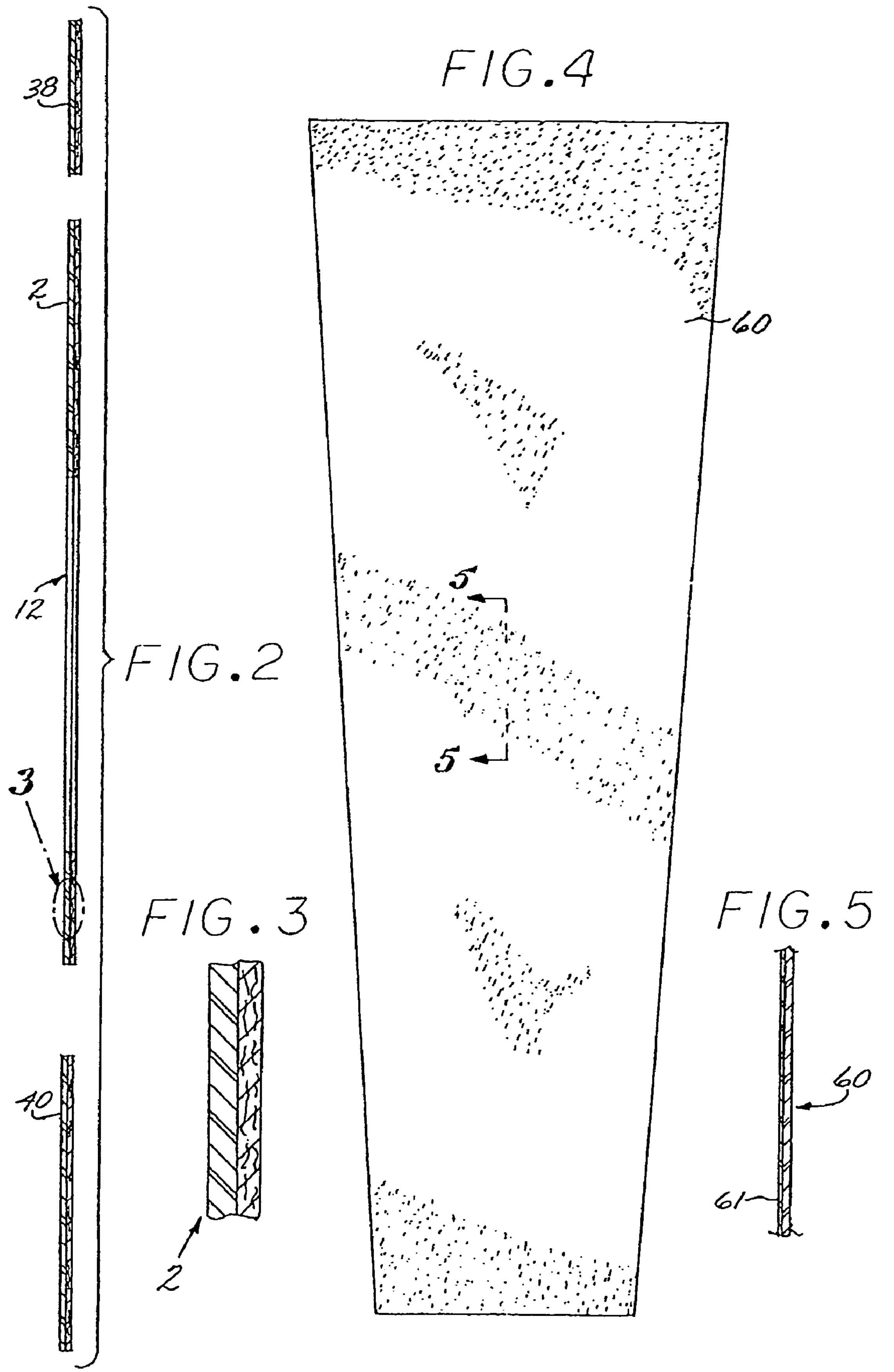
FIG. 2 is a horizontal cross-sectional view taken along the line designated 2-2 in FIG. 1.
FIG. 3 is an enlarged view of the encircled area designated 3 in FIG. 2.
FIG. 4 is a front view of a backing sheet used in a panel grip according to one embodiment.
FIG. 5 is a horizontal cross-sectional view taken along the line designated 5-5 in FIG. 4.

Panel P also preferably comprises multiple layers. Referring to FIG. 3, in one embodiment, panel P, including the sheet 2 and inserts 30, 32, 34, 36, 38, comprises an inner strength layer 4 and an outer tactile layer 6. Preferably, outer tactile layer 6 comprises polyurethane. Other materials than polyurethane could be used and still achieve some advantages. In particular, other polymeric compounds can be used to create the outer layer and achieve some advantages. In addition, additional materials such as waterproofing coatings may be incorporated on the outer surface of the outer tactile layer 6 without departing from the invention disclosed herein. Inner strength of layer 4 preferably comprises a felt. Alternative embodiments of this invention may use other fabric or textile layers in lieu of, or in conjunction, with felt. In another embodiment, the inner strength layer 4 may comprise a polymer, more preferably ethylene vinyl acetate (EVA).

The outer surface of inner strength layer 4 is preferably bonded to the inner surface of outer tactile layer 6. For purposes of this disclosure, the definition of bonding is intended to have a broad meaning, including commonly understood definitions of bonding, adhering, fixing, attaching, sewing, coupling, and gluing. When polyurethane is used in outer layer 6, such polyurethane is preferably coagulated to define pores (not shown). The polyurethane may be coagulated and bonded directly to inner strength layer 4, or may be first coagulated on an intermediary layer (not shown) and later attached to inner strength layer 4. Such a process is described in greater detail in, for example, U.S. patent application Ser. No. 11/172,770.

Figure 6:
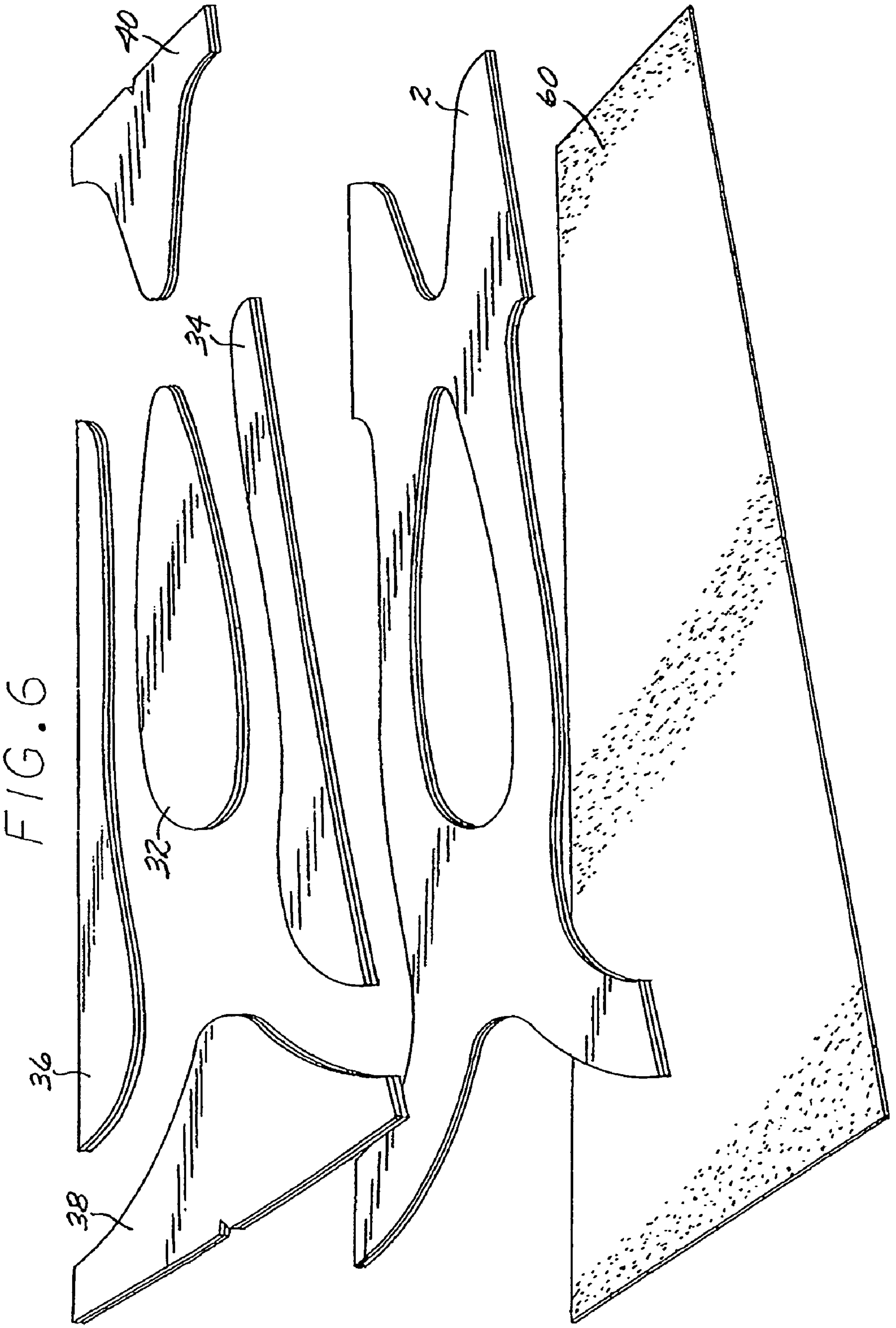
FIG. 6 is a perspective view of a first sheet and inserts being coupled to a backing sheet according to one embodiment.
Figure 7:
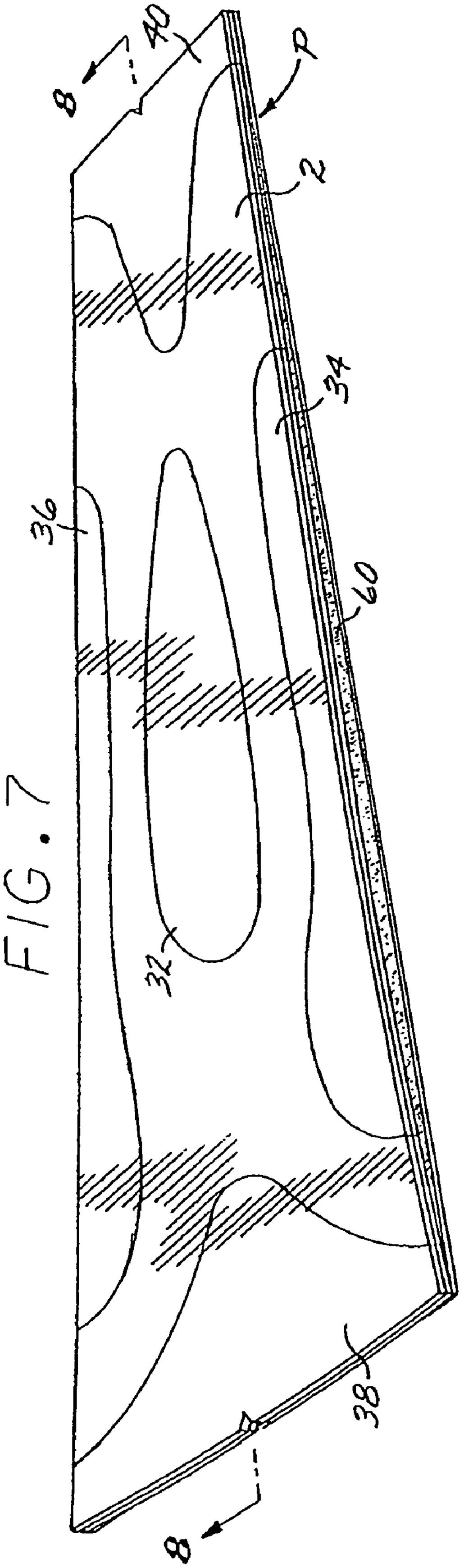
FIG. 7 is a perspective view of a panel according to one embodiment.
Figure 16:
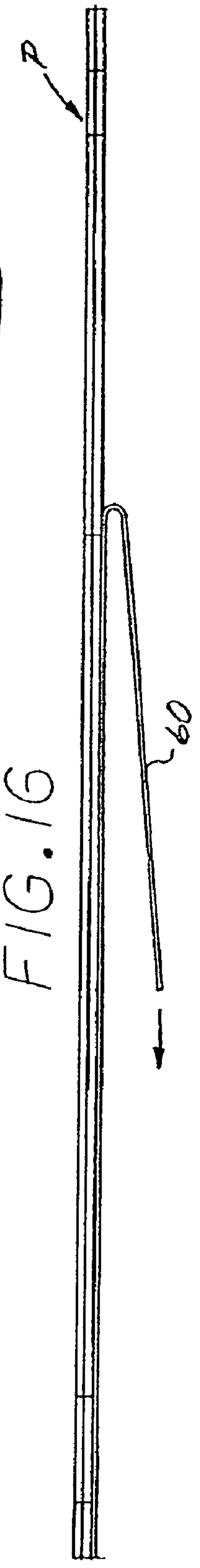
FIG. 16 is a horizontal cross-sectional view of a panel member of a panel grip during a step according to one embodiment.

Referring to FIGS. 6 and 7, sheet 2 and inserts 32, 34, 36, 38, 40 are preferably arranged on a backing sheet 60. Backing sheet 60 is preferably an adhesive 61 coated plastic. The adhesive 61 used is preferably strong enough to maintain the relative positions of the sheet and the inserts; however, it is preferably removable prior to bonding the panel P to the underlisting sleeve U. In some embodiments, backing sheet 60 is removed after the sheet and the inserts have been joined, as shown in FIG. 16. Alternatively, backing sheet may comprise a thin layer of material intended to remain on the grip. For example, a thin sheet of felt or other strength material may be used and permanently joined or bonded to the backs of the sheet 2 and the inserts 32, 34, 36, 38, 40.

Figure 8:
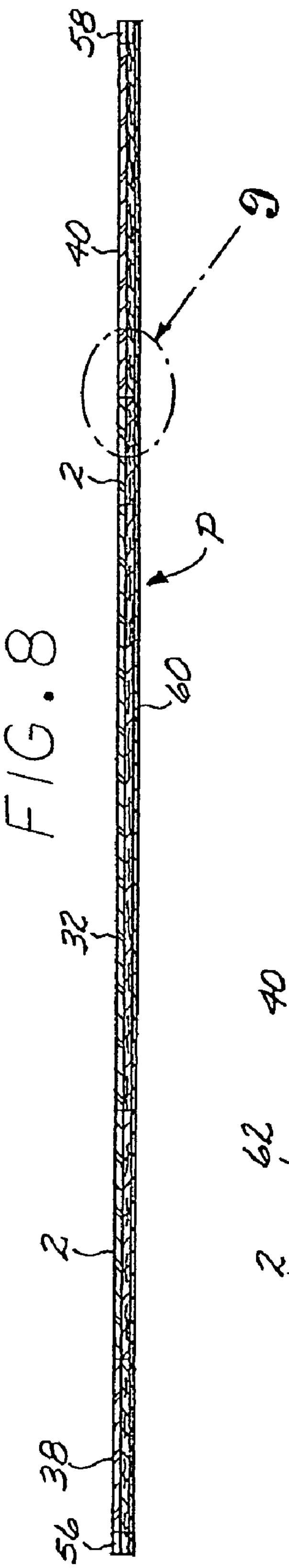
FIG. 8 is a horizontal cross-sectional view taken along the line designated 8-8 in FIG. 7.
Figure 9:
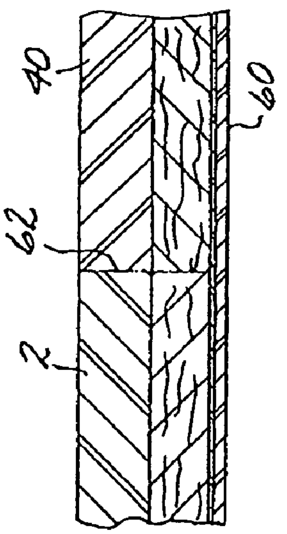
FIG. 9 is an enlarged view of the encircled area designated 9 in FIG. 8.
Figure 10:
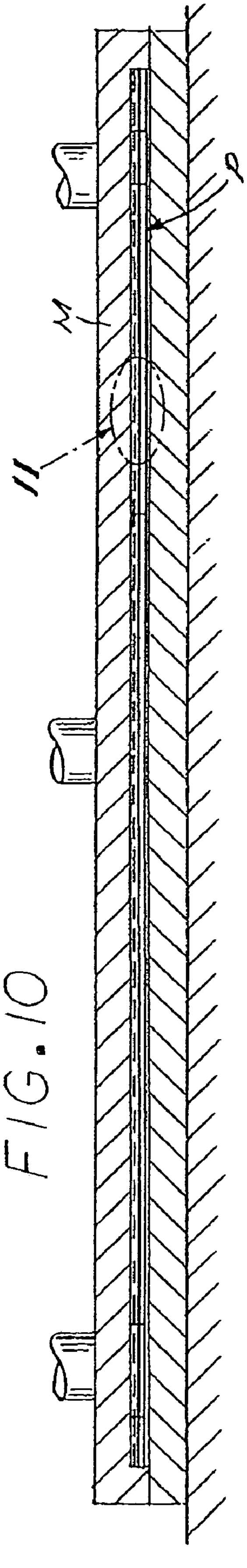
FIG. 10 is a horizontal cross-sectional view showing a mold which may be utilized in forming a panel member of a panel grip according to one embodiment.

As shown in FIG. 6, sheet 2 and inserts 32, 34, 36, 38, 40 are preferably arranged on backing sheet 60. As shown in FIGS. 7-9, the sheet and the inserts are preferably held in position by backing sheet 60 such that their sides are in contact with each other to form intersections 62. These intersections 62 may include one or more adhesives to bond or join the sides of the inserts to the sides of the sheet. If a multiple layered panel is desired, and the inner layer includes felt, an adhesive with the chemical formula toulene ($CH_5CH_3$), ethyl acetate ($C_4H_8O_2$), methyl ethyl ketone ($C_4H_8O$), and acetone ($C_3H_6O$) may be used between the layers of felt along at least a portion of the intersection. If an outer layer of polyurethane is used, the adhesive between the polyurethane layers along at least a portion of the intersection may be a polyurethane deposit.

Figure 12:
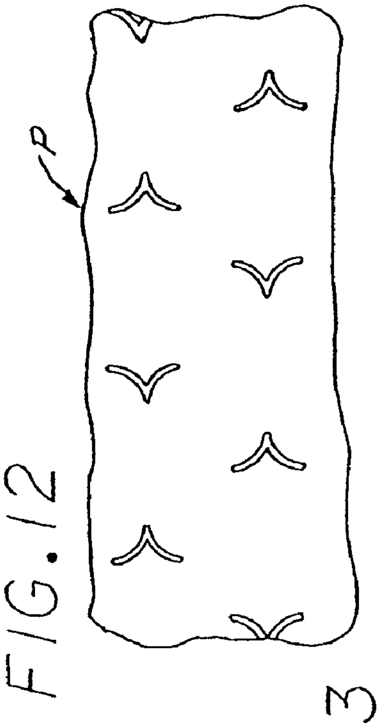
FIG. 12 is an enlarged view of a pattern that may be formed by the mold shown in FIGS. 10 and 11.
Figure 11:
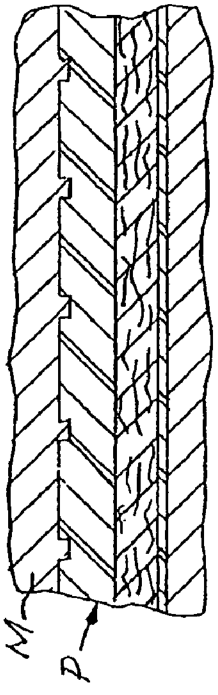
FIG. 11 is an enlarged view of the encircled area designated 11 in FIG. 10.
Figure 15:
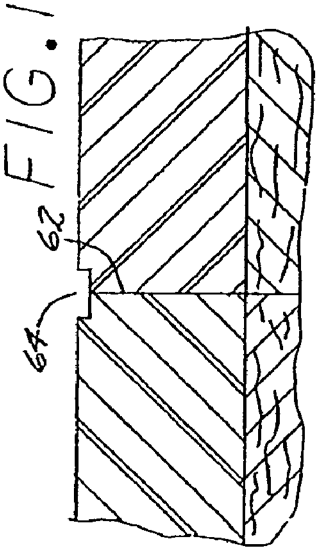
FIG. 15 is a horizontal cross-sectional view taken along the line designated 15-15 in FIG. 14.

As shown in FIGS. 10-14, a mold M is preferably used to form a friction enhancing pattern on the outer surface of the panel P. An example of such a friction enhancing pattern is shown in FIG. 12. As shown in detail in FIG. 15, mold M may also form a channel 64 along a portion or the entire intersections 62 between the sheet 2 and the inserts 32, 34, 36, 38, 40. The mold M preferably uses heat to melt a portion of the outer surface of the panel P. Along the intersections 62, this heat preferably melts the polyurethane, if used, so that the polyurethane joins the outer surface of the insert to the outer surface of the sheet to form the unitary panel P.

As described in other patents, for example U.S. Pat. No. 6,843,732, an additional deposit of polyurethane may be placed along the intersections 62. This additional deposit may be placed in a portion or the entire channel 64, if formed in the panel P, or along a portion or the entire outer surface of the intersections 62. As previously disclosed, this deposit may be buffed or otherwise smoothed such that the surface of the grip is substantially smooth. Alternatively, the deposit need not be smoothed.

Once the sheet 2 and the inserts 32, 34, 36, 38, 40 have been joined to form panel P, backing sheet 60 may be removed as shown in FIG. 16. FIGS. 17-48 show further manipulation of panel P and its application to an underlisting U or putter underlisting PU to form a grip G or a putter grip PG, respectively.

A similar method may be employed to form a spiral wrap grip with one or more inserts. In addition, one or more inserts may be positioned within the cutouts. In such an embodiment, two or more inserts would, for example, replace insert 32 in cutout 12.

Figure 18:
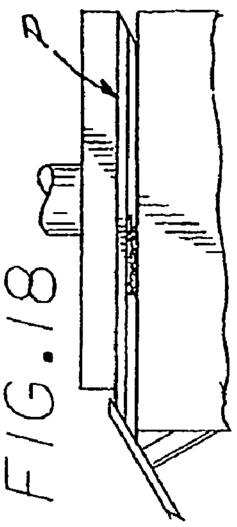
FIG. 18 is a side view showing a second longitudinal side of a panel member being skived parallel to the first side according to one embodiment.
Figure 17:
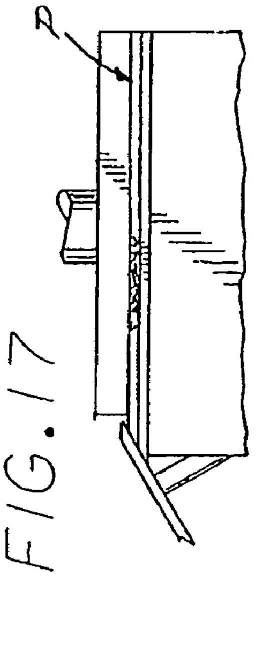
FIG. 17 is a side view showing a first longitudinal side of a panel member being skived according to one embodiment.
Figure 19:
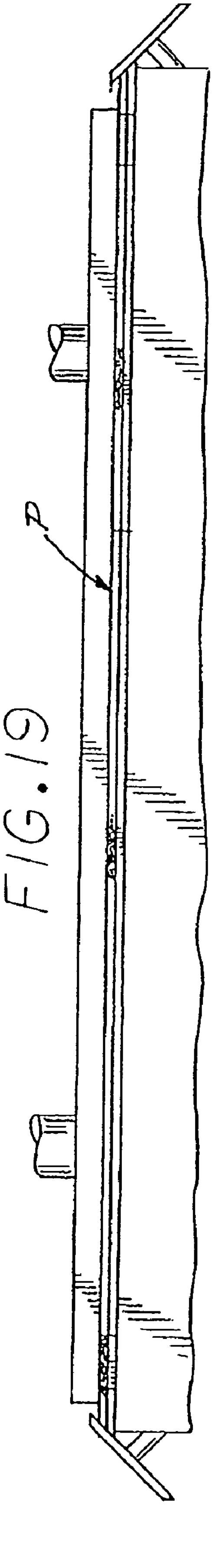
FIG. 19 is a side view showing the top and bottom sides of a panel member of one embodiment being skived anti-parallel to each other.
Figure 24:
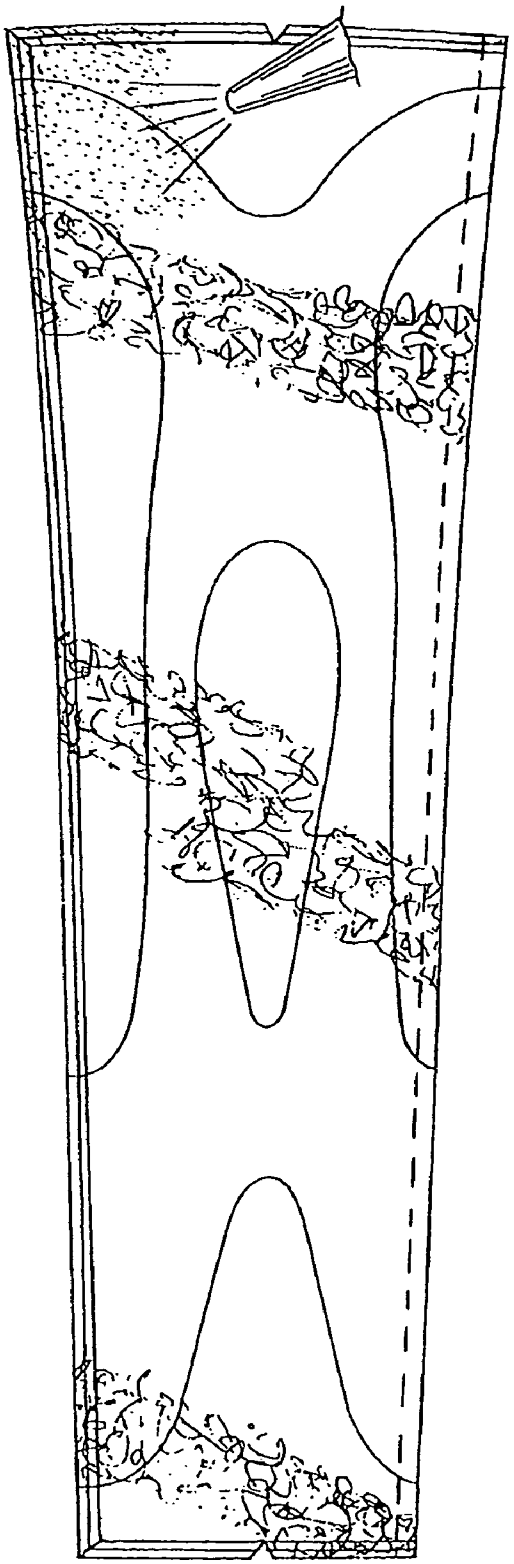
FIG. 24 is a rear view showing adhesive being applied to a panel member of a panel grip according to one embodiment.
Figure 25:
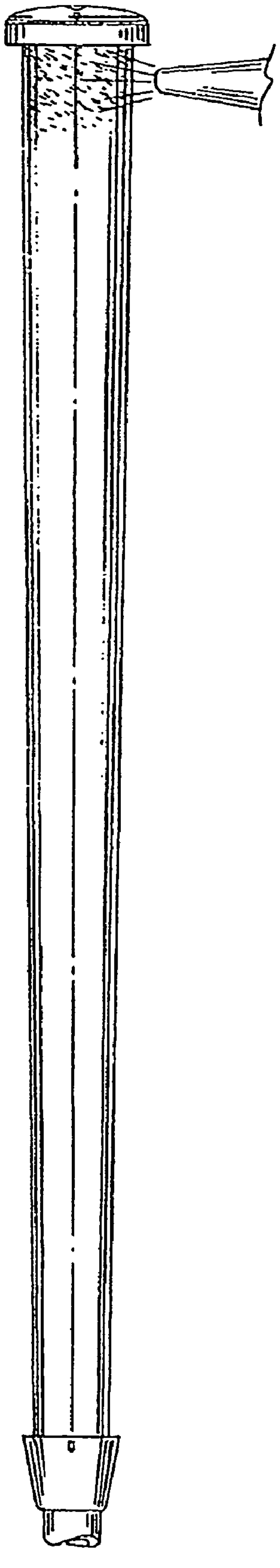
FIG. 25 is a front view showing adhesive being applied to the exterior of an underlisting sleeve according to one embodiment.
Figure 26:
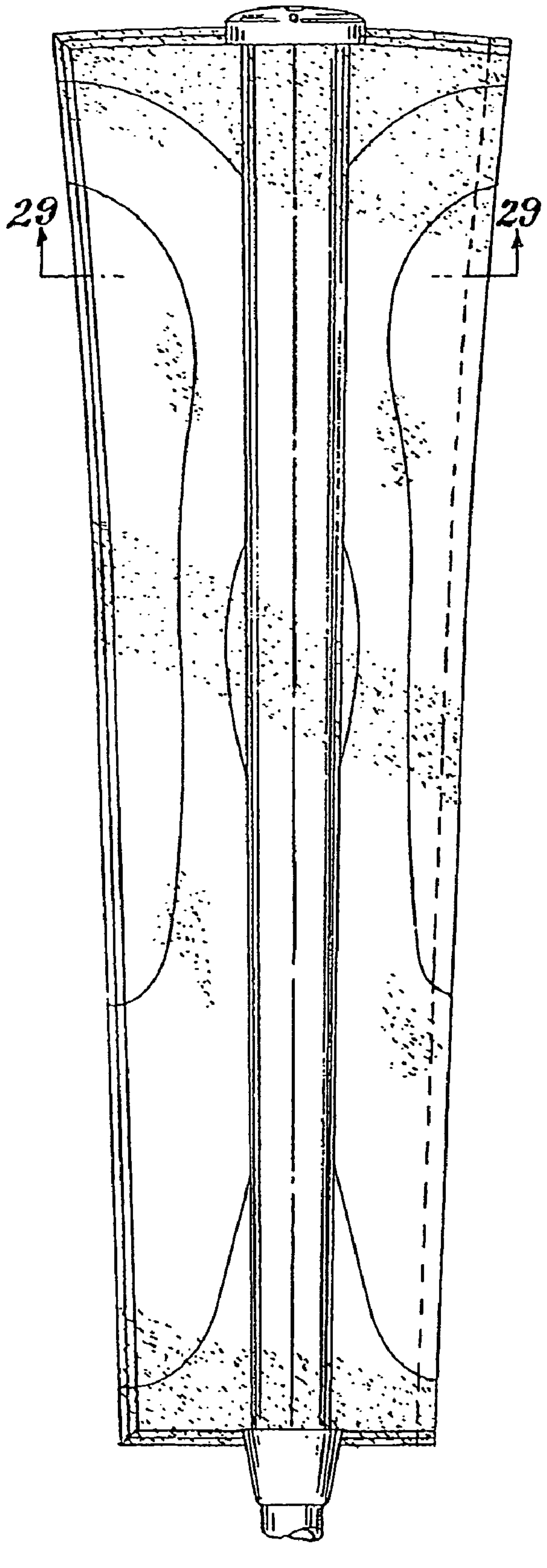
FIG. 26 is a rear view showing a panel member being coupled to an underlisting sleeve according to one embodiment.
Figure 27:
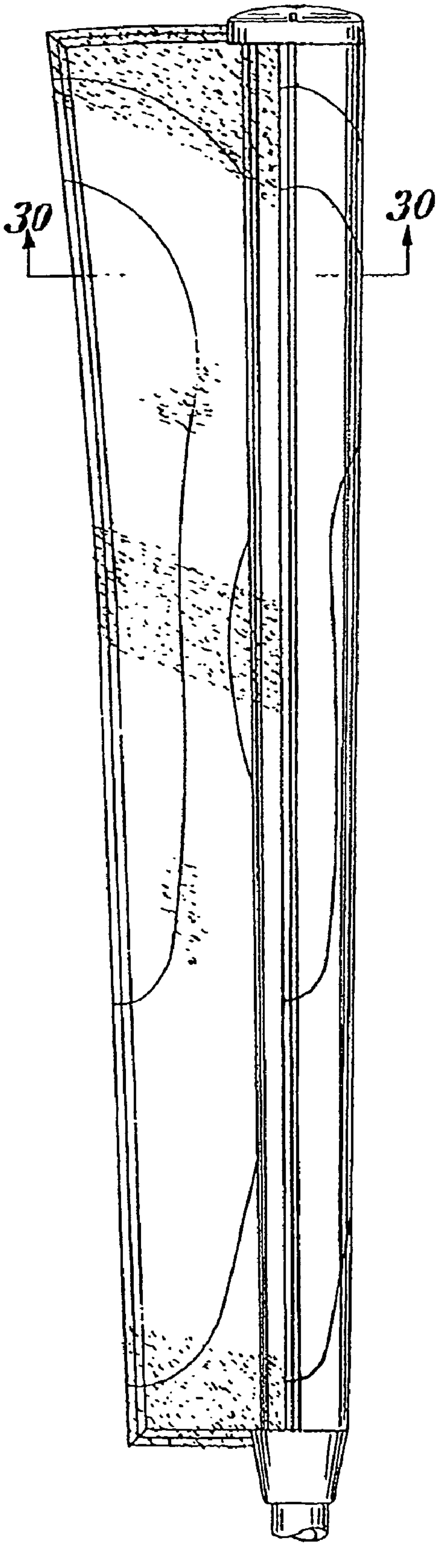
FIG. 27 is a rear view of showing another step in a panel member being coupled to an underlisting sleeve according to one embodiment.
Figure 28:
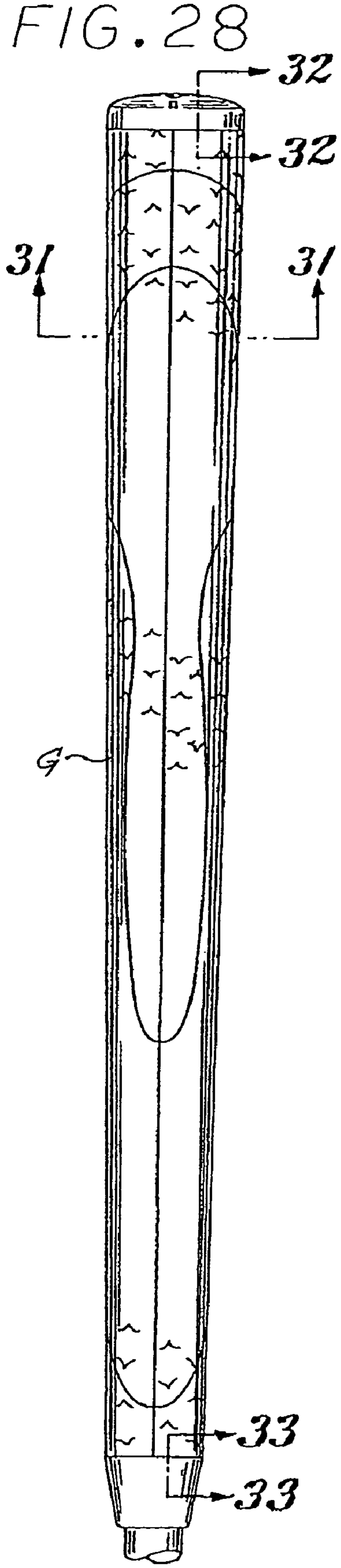
FIG. 28 is a rear view of a panel member coupled to an underlisting sleeve according to one embodiment.
Figure 29:
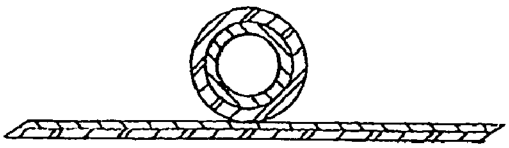
FIG. 29 is a cross-sectional view taken along the line designated 29-29 in FIG. 26.
Figure 30:
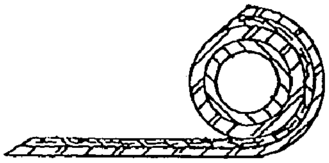
FIG. 30 is a cross-sectional view taken along the line designated 30-30 in FIG. 27.
Figure 31:
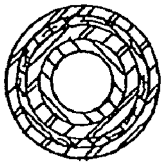
FIG. 31 is a cross-sectional view taken along the line designated 31-31 in FIG. 28.
Figure 33:
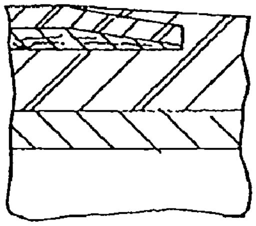
FIG. 33 is an enlarged view of the encircled area designated 33 in FIG. 28.
Figure 32:
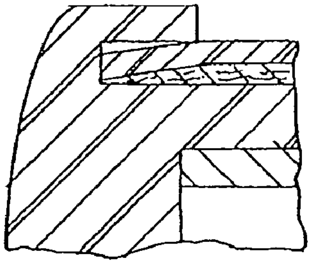
FIG. 32 is an enlarged view of the encircled area designated 32 in FIG. 28.
Figure 34:
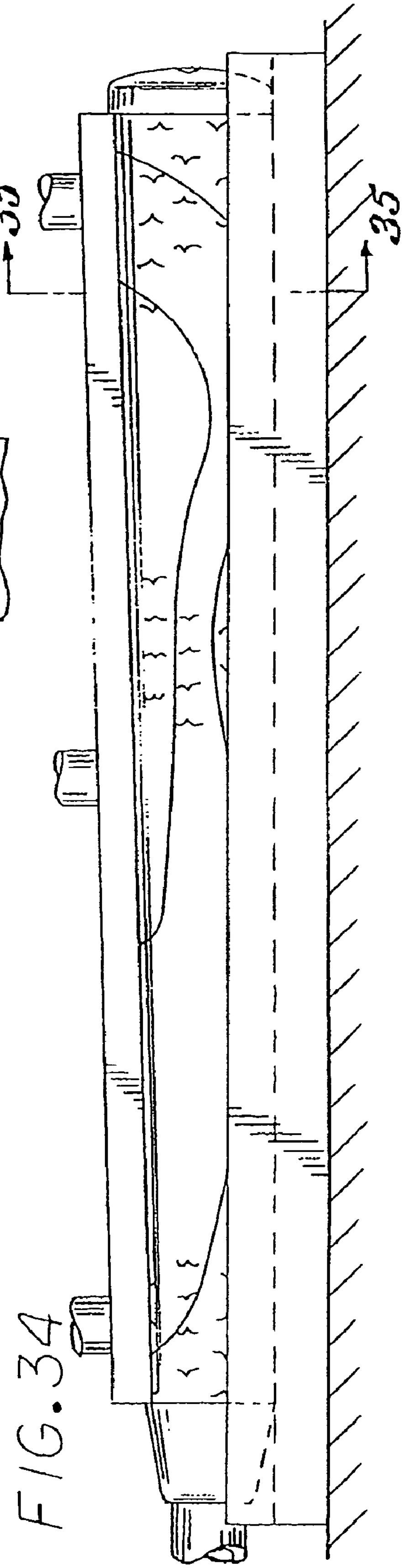
FIG. 34 is a horizontal side view showing a mold which may be utilized in forming a panel grip according to one embodiment.
Figure 36:
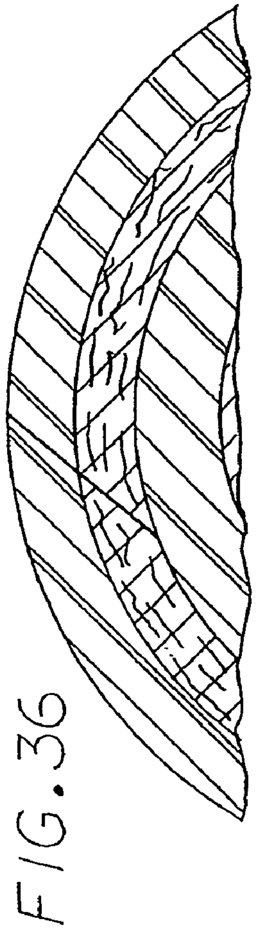
FIG. 36 is an enlarged view of the encircled area designated 36 in FIG. 35.
Figure 35:
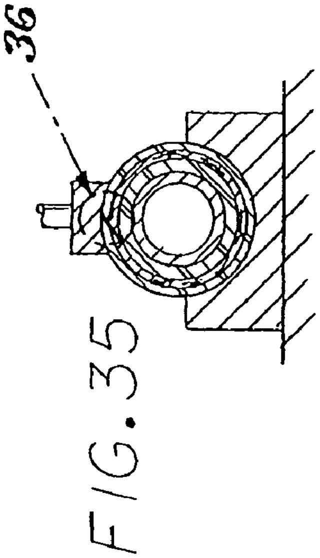
FIG. 35 is a vertical cross-sectional view taken along the line designated 35-35 in FIG. 34.
Figure 37:
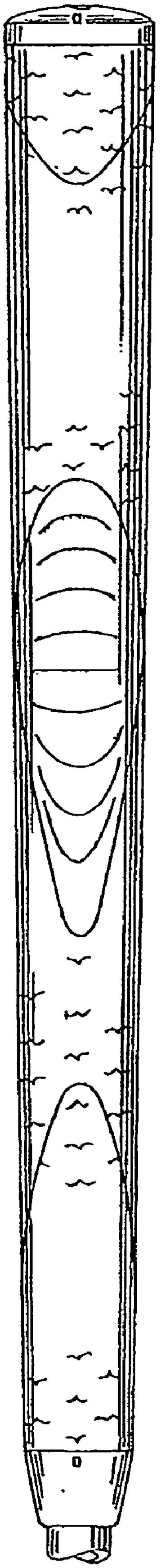
FIG. 37 is a front view of a panel grip according to one embodiment.
Figure 38:
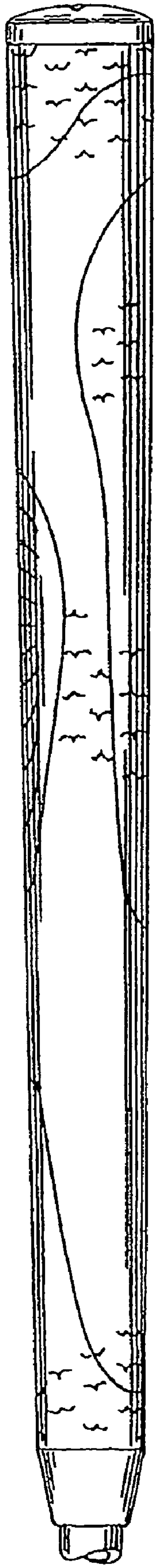
FIG. 38 is a side view of a panel grip according to one embodiment.
Figure 44:
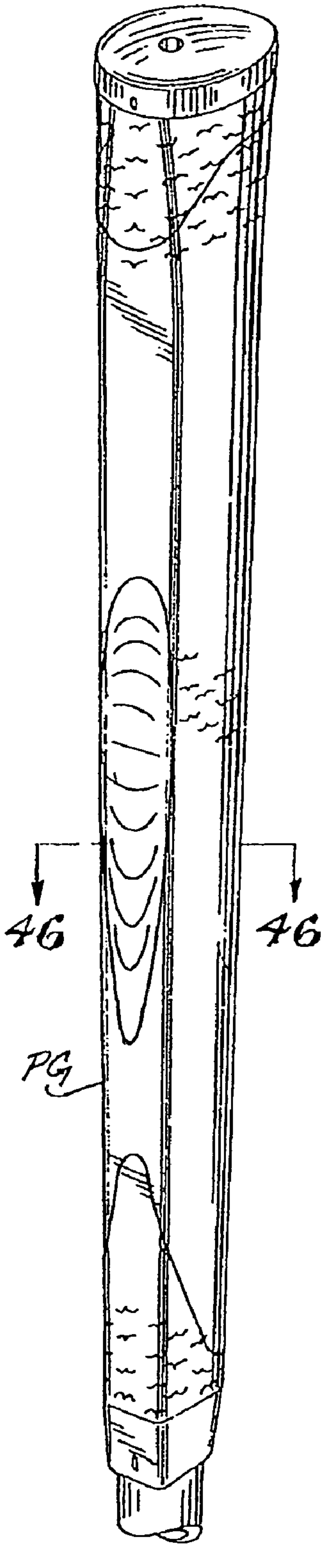
FIG. 44 is a perspective front view of a grip according to one embodiment.
Figure 45:
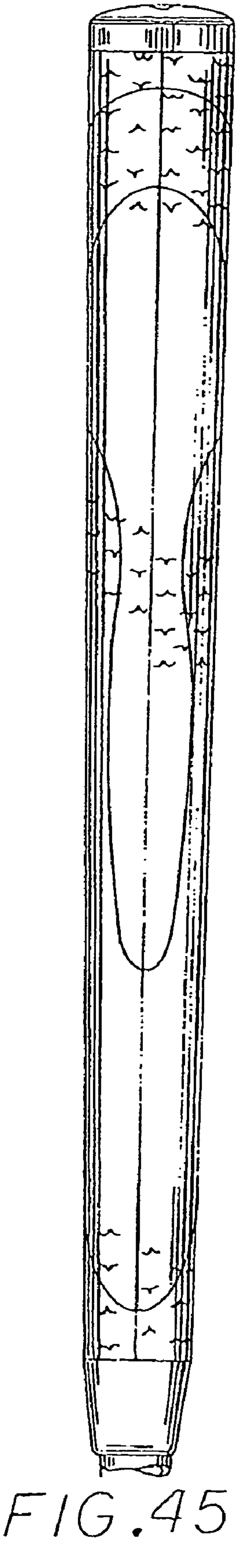
FIG. 45 is a rear view of the grip shown in FIG. 44.
Figure 46:
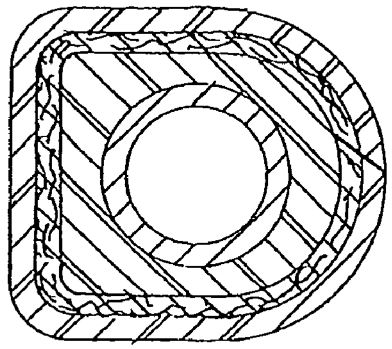
FIG. 46 is a cross-sectional view taken along the line designated 46-46 in FIG. 44.

As shown in FIGS. 17-19, the sides of panel P are preferably skived. It will be noted from FIGS. 17 and 18 that the skiving on the first and second sides of panel P are preferably parallel to one another. Such a configuration of skiving may be advantageously used to form a substantially longitudinal overlapping intersection of the first and second skived longitudinal sides, as shown in FIGS. 29-31. Alternatively, first and second sides of panel P may be skived anti-parallel in a similar manner to the skiving of top and bottom sides of panel P shown in FIG. 19. With anti-parallel longitudinal side edges, the substantially longitudinal intersection may be formed by over lapping the edges. Alternatively, the intersection may be sewn or otherwise joined.

Generally, the outer surface of the panel P is in direct contact with the hand of the user using a grip G. However, as one of skill in the art would appreciate, an additional coating layer over the panel P may be included. It should be understood that the outer surface of a grip embodying the present invention may also be coated, in whole or in part, by means of a brush, nozzle, spray, or the like with a thin layer of polyurethane and/or other material (not shown) to protect such surface, add tackiness thereto, and increase the durability thereof. The additional coating layer is preferably transparent, or semi-transparent, such that some or all of the pattern on the outer surface of the panel P created by the cutouts and inserts remains visible. The additional coating layer may be somewhat opaque, as long as a portion of the panel P is observable through the additional coating layer. If an additional coating layer is included over the outer surface of the grip, this layer may be further enhanced with a friction enhancing pattern as is known to those of skill in the art. The additional coating layer may be incorporated into a previously formed grip G or may be applied to the panel P prior to attachment to the underlisting sleeve U. If used, the additional coating layer would be in direct contact with the user's hand rather than the outer surface of the grip. However, even when an additional coating layer is included, the outer surface of the panel P is considered to be the outer surface of the grip.

Embodiments of the golf club grip provide the advantages over the existing wrapped and single panel grips described hereinbefore. Additionally, such grip has the appearance of a molded, one-piece grip familiar to professional and low-handicap golfers. Although some of such golfers are reluctant to use a non-traditional wrapped club grip, they are willing to play with a structurally integral grip of these embodiments since such grip affords the shock absorbing and tackiness qualities of a wrapped grip. Further, many individual golfers and high school, college, and professional teams like the camaraderie and unification that can be achieved by putting team colors on their golf grips without sacrificing comfort, durability, or tackiness because of paint embossment. These embodiments allow the application of the multiple colors to golf club and putter grips to allow these teams and individuals to express their spirit and enthusiasm in a way never before possible.

It will be understood that the foregoing is only illustrative of the principles of the invention, and that various modifications, alterations, and combinations can be made by those skilled in the art without departing from the scope and spirit of the invention.

What is claimed is:

1. A method of making a grip for the shaft of a golf club, the method comprising the steps of:

providing an underlisting sleeve;

providing a first backing sheet;

providing a second sheet;

forming a cut-out in the second sheet;

providing an insert;

arranging the second sheet and the insert on the first backing sheet;

joining the second sheet and the insert along the intersection of the cut-out and the insert to define a panel;

removing the first backing sheet; and attaching the panel to the underlisting sleeve.

2. A method as in claim 1, wherein the steps of providing a second sheet and an insert further comprise providing a sheet and an insert comprising different durometer material.

3. A method as in claim 1, wherein the steps of providing a second sheet and an insert further comprise providing a sheet and an insert comprising different colors.

4. A method as in claim 1, wherein the panel further comprises a top side, a bottom side, a first substantially vertical side, and a second substantially vertical side, the method further comprising the step of:

wrapping the panel about the underlisting sleeve such that the first and second sides join to form a substantially vertical seam.

5. A method as in claim 4, further comprising the step of:

adhering the vertical sides along the seam.

6. A method as in claim 1, further comprising the step of:

providing an adhesive between the cut-out and the insert.

7. A method as in claim 1, further comprising the steps of:

providing a first adhesive between the cut-out and the insert and providing a second adhesive between the cut-out and the insert.

8. A method as in claim 1, wherein the step of attaching the panel to the underlisting sleeve further comprises adhering the panel to the sleeve.

9. A method as in claim 1, wherein the grip further comprises an outer surface and the method further comprises the step of:

forming a friction enhancing pattern on the outer surface of the grip.

* * * * *

UNITED STATES PATENT AND TRADEMARK OFFICE

CERTIFICATE OF CORRECTION

PATENT NO. : 7,566,375 B2
APPLICATION NO. : 11/417623
DATED : July 28, 2009
INVENTOR(S) : Ben Huang It is certified that error appears in the above-identified patent and that said Letters Patent is hereby corrected as shown below:

Title Page; item (56);

At page 2, second column, line 37, please change “Lamkin et al.” to --Manual et al.--.

At page 3, second column, line 27, please change “skive 3” to --skive--.

Signed and Sealed this
Seventh Day of June, 2011

David J. Kappos
*Director of the United States Patent and Trademark Office*